US005615375A

United States Patent [19]

Ibusuki et al.

[11] Patent Number: 5,615,375
[45] Date of Patent: Mar. 25, 1997

[54] INTERRUPT CONTROL CIRCUIT

[75] Inventors: Takeshi Ibusuki; Shinji Miyahara, both of Kawasaki, Japan

[73] Assignee: Fujitsu Limited, Kawasaki, Japan

[21] Appl. No.: 153,159

[22] Filed: Nov. 17, 1993

[30] Foreign Application Priority Data

Nov. 17, 1992 [JP] Japan .................... 4-305753

[51] Int. Cl.⁶ .................................................. G06F 9/46
[52] U.S. Cl. ................................... 395/737; 395/591
[58] Field of Search .................... 395/725, 325, 395/775, 375, 733–742, 293, 249, 299

[56] References Cited

U.S. PATENT DOCUMENTS

| 4,349,873 | 9/1982 | Fukasawa et al. | 395/742 |
|---|---|---|---|
| 5,163,152 | 11/1992 | Okamoto | 395/733 |
| 5,168,566 | 12/1992 | Kuki et al. | 395/650 |
| 5,212,779 | 5/1993 | Saito | 395/375 |
| 5,212,796 | 5/1993 | Allison | 395/737 |
| 5,218,703 | 6/1993 | Fleck et al. | 395/737 |
| 5,222,215 | 6/1993 | Chou et al. | 395/735 |
| 5,222,239 | 6/1993 | Rosch | 395/750 |
| 5,257,357 | 10/1993 | Yishay et al. | 395/725 |
| 5,261,107 | 11/1993 | Klim et al. | 395/725 |
| 5,280,618 | 1/1994 | Takagi | 395/725 |
| 5,301,283 | 4/1994 | Thacker et al. | 395/325 |
| 5,301,331 | 4/1994 | Ueno et al. | 395/725 |
| 5,313,640 | 5/1994 | Beardsley et al. | 395/725 |
| 5,410,715 | 4/1995 | Ishimoto et al. | 395/775 |
| 5,495,615 | 2/1996 | Nazar et al. | 395/733 |

*Primary Examiner*—Jack B. Harvey
*Assistant Examiner*—Paul R. Myers
*Attorney, Agent, or Firm*—Staas & Halsey

[57] ABSTRACT

An interrupt control circuit, used for a data processing unit which fetches and executes an instruction and which has an interrupt function, for controlling an interrupt request signal which is input from a device external to the data processing unit and which has a respective interrupt level assigned. The interrupt control circuit stores in an interrupt level register, interrupt-accept level data which corresponds to the instruction and specifies the interrupt level of the interrupt request signal to be accepted for interrupt; reads the interrupt-accept level data corresponding to the instruction from the interrupt level register when an instruction is fetched for execution and compares the interrupt-accept level read with the interrupt level of the interrupt request signal; and accepts the interrupt request signal to initiate the interrupt function of the data processing unit in dependence upon a result of the comparison.

14 Claims, 9 Drawing Sheets

INTERRUPT CONTROL CIRCUIT

BACKGROUND OF THE INVENTION

1. Field of the Invention

The present invention is related to an interrupt control circuit of a data processing unit, especially, to an interrupt control circuit which accepts or holds an external interrupt request signal (or an interrupt request signal from an unit external to the data processing unit).

In recent years, many data processing units usually improve their processing performance by utilizing special facilities such as a pipeline and various types of buffers including cache memories, for instruction and data. Data processing units having such facilities can demonstrate increased processing performance when an external interrupt, e.g., an input/output interrupt and timer interrupt, is not triggered. When an external interrupt is triggered, performance decreases because it may invalidate instructions and data being processed in those facilities.

Accordingly, an interrupt control circuit which allows a data processing unit to demonstrate an increased processing performance, even when an external interrupt is triggered, is in great demand.

2. Description of the Related Art

FIG. 1 is a block diagram illustrating an interrupt control circuit as is known in the prior art.

External interrupt (e.g., input/output interrupt and timer interrupt) request signals IRQ, with respective priority levels (e.g., 1–15) assigned, are first set in a state control register 15. The outputs from the state control register 15 are ANDed with interrupt-mask information (mask bits), which are set by a program in a mask register 16, by an AND circuit 11. The mask bits, corresponding to the external interrupt requests, specify whether to enable the corresponding interrupt requests. The interrupt request signal whose corresponding mask bit is set to 1 is selected by the AND circuit 11 to output logical 1 to a priority circuit 12. When a plurality of interrupt request signals are selected by the AND circuit 11, the priority circuit 12 selects only one of the highest priority level to enable for interrupt.

The interrupt request signal IQL is input to an execution unit 3a. When fetching, or after having fetched, an instruction from a programmed instruction stream, the execution unit 3a checks to see if there is an interrupt request signal IQL enabled. If there is, the execution unit 3a accepts the interrupt request and performs an interrupt function; otherwise, it fetches an instruction and executes the instruction fetched.

According to the related art as described above, when an external interrupt request IRQ is input while a data processing unit (hereinafter called a CPU) 1p is executing an instruction stream, the external interrupt request IRQ is accepted or held, simply depending on the interrupt-mask information stored in the mask register 15. That is, when the above condition of the interrupt-mask information is satisfied for an interrupt request, the CPU 1p accepts the interrupt request and performs interrupt operation, even when the interrupt request is of lower priority, i.e., not so urgent to interrupt the program immediately at the instruction being executed when the interrupt request is input.

Eventually, instructions and data in a cache memory and also instructions in a pipeline, which are all provided to achieve a high-speed processing performance of CPU 1p, become invalid and have to be discarded.

SUMMARY OF THE INVENTION

It is an object of the present invention to provide an interrupt control circuit which allows a data processing unit to demonstrate an increased processing performance even when an external interrupt request are generated.

To achieve the above and other objects, the present invention provides a level storage device, a comparison device and an acceptance device.

In an interrupt control circuit, used for a data processing unit which fetches and executes an instruction and which has an interrupt function for controlling an interrupt request signal which is input from a device external to the data processing unit and which has a respective interrupt level assigned, the level storage device stores interrupt accept level data which corresponds to the instruction and specifies the interrupt level of the interrupt request signal to be accepted for interrupt. The comparison device reads the interrupt-accept level data corresponding to the instruction from the level storage means and compares the interrupt-accept level read with the interrupt level of the interrupt request signal when an instruction is fetched for execution. The acceptance device accepts the interrupt request signal to initiate the interrupt function of the data processing unit in dependence upon the comparing by the first comparison device.

BRIEF DESCRIPTION OF THE DRAWINGS

Throughout the above-mentioned drawings, identical reference numerals are used to designate the same or similar component parts.

DESCRIPTION OF THE PREFERRED EMBODIMENTS

Figure 1:
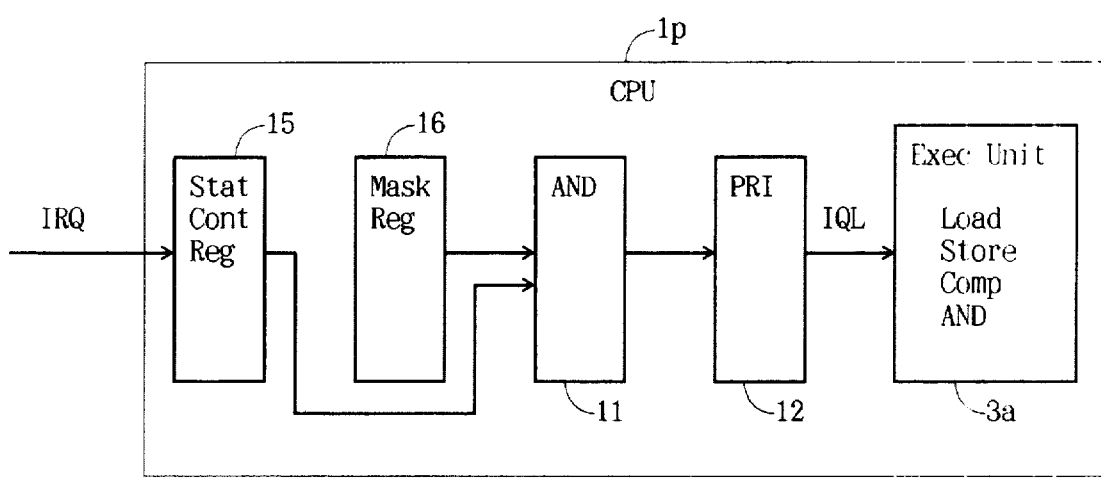
FIG. 1 is a block diagram illustrating an interrupt control circuit of the related art.
Figure 2A:
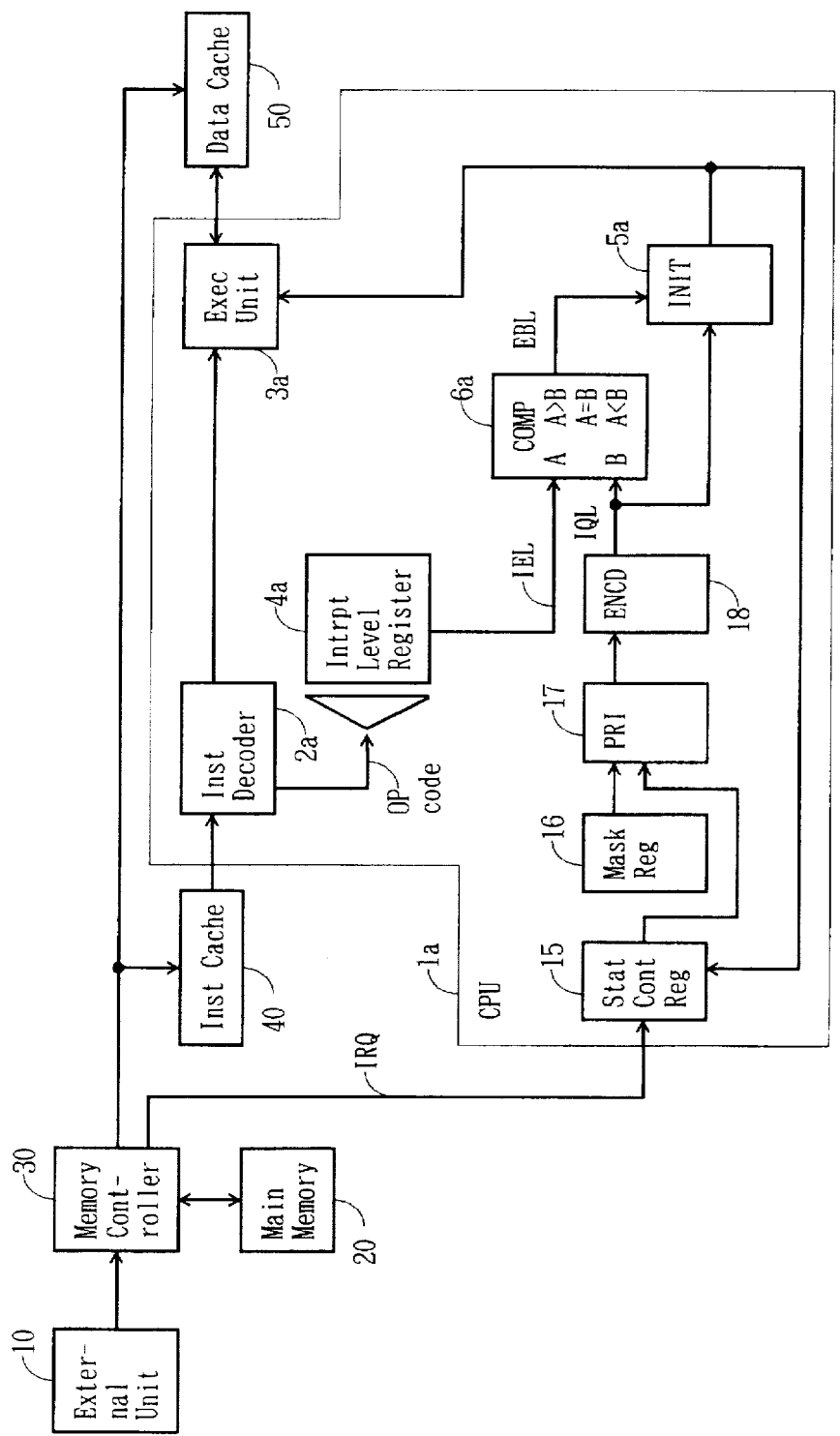
FIG. 2A is a block diagram illustrating an interrupt control circuit according to a first embodiment of the present invention.

FIG. 2A is a block diagram illustrating an interrupt control circuit according to the first embodiment of the present invention.

The instruction set of a data processing unit (CPU) is divided broadly into general instructions and control instructions. The control instructions, which manipulate the CPU hardware itself and its facilities, stop and invalidate pipeline operations temporarily and invalidate the data in a cache memory (an instruction cache 40 and an data-cache 50 in the Figure).

The interrupt control circuit of the first embodiment of the present invention holds an external interrupt request while the general instructions are being executed until a control instruction appears and accepts the interrupt request on detecting, in the process of executing an instruction stream, a control instruction which prevents the data processing unit from making the best use of it's high-speed processing features and facilities. Hereinafter, a control instruction is called an interruptible instruction in this sense.

Looking at FIG. 2A, an external unit 10 is, for example, an input/output unit or a timer. The input/output unit transfers (writes/reads) data to/from a main memory 20 through a memory controller 30 and generates an external interrupt request signal when completing a transfer of a predesignated amount of data, for example. The timer generates an interrupt request when, for example, a predesignated length of time has elapsed. The memory controller 30 arbitrates a conflict between two or more input/output devices requesting data transfer to/from the main memory 20. It also outputs an interrupt request (IRQ) signal to the CPU 1a in accordance with an interrupt request signal from the external unit 10.

External interrupt (e.g., input/output interrupt and timer interrupts) request signals, with respective priority levels (e.g., 1–15) assigned, are first set in a state control register 15. A mask register 16 stores interrupt mask bits, which are set by a program, to specify whether to enable the respective levels of interrupt requests. The interrupt request signals from the state control register 15 are each ANDed by a priority circuit (PRI) 17. Corresponding interrupt mask bits and those having corresponding mask bits set to 1 are selected. Further, of the interrupt request signals selected, only the one of highest priority is selected by the priority circuit 17 and outputted to an encoder circuit (ENCD) 18. There, the interrupt level of the selected interrupt request signal, for example, is encoded into a 4-bit IQL signal to represent 15 interrupt levels.

An instruction cache (Inst Cache) 40, is provided to reduce time required for the CPU 1a to fetch instructions from the main memory 20. Preferably the instruction cache 40 is a high-speed buffer storage for containing a copy of such instructions from the main memory 20 as are most probably to be used by CPU 1a. A data cache 50, provided for the same purpose as the instruction cache 40, is for containing a copy of data from the main memory 20.

An interrupt level register (Intrpt Level) 4a contains interrupt-enable level information that is set by a program in order to specify interrupt levels corresponding to the kind of instructions for enabling an external interrupt request. The interrupt-enable level information each consists of, for example, 4 bits corresponding to the 15 interrupt levels of the external interrupt request.

An instruction decoder 2a fetches an instruction from the instruction cache 40 and decodes it in order to facilitate execution of the instruction by an execution unit (Exec Unit) 3a. It also refers to the interrupt level register 4a for the interrupt-enable level information based on an operation (OP) code of the instruction decoded, as shown in FIG. 2B.

The execution unit 3a interprets the OP code of the instruction decoded and executes it according to the OP code. It also performs an interrupt function which stops a running program in such a way that it can be resumed at a later time, and in the meanwhile permits other program to be executed.

Figure 2B:
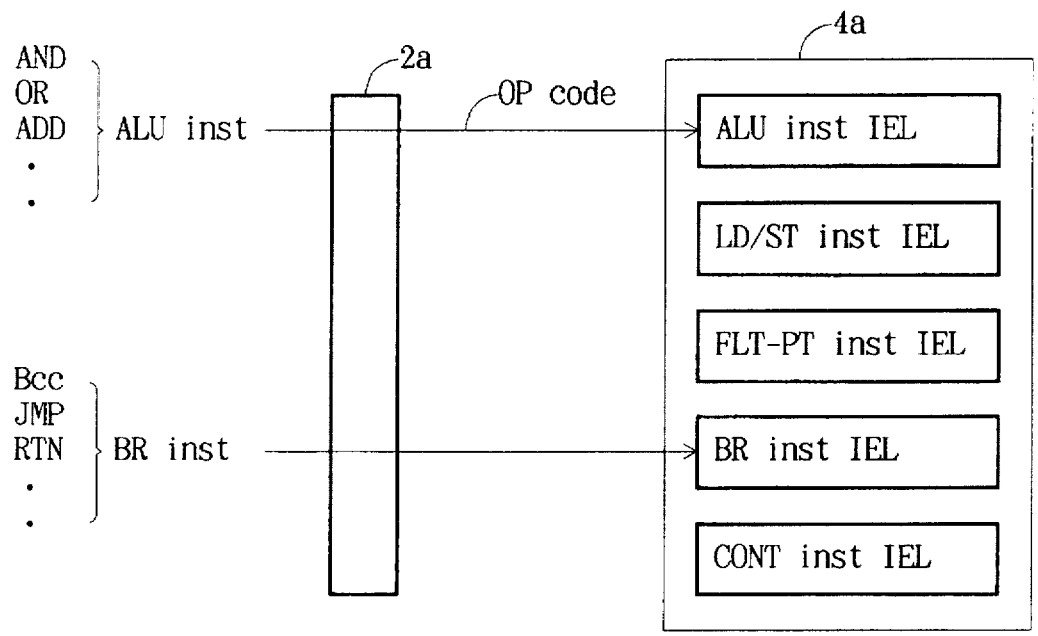
FIG. 2B is a schematic diagram illustrating an interrupt level register of the present invention.

FIG. 2B is a schematic diagram illustrating an interrupt level register of the present invention.

For ALU instructions, such as AND, OR and ADD, which use a hardware arithmetic and logical unit (ALU), an ALU instruction part of the interrupt level register 4a is referred to for the interrupt-enable level (IEL) data. Similarly, for branch instructions, such as conditional branch (Bcc), jump (JMP) and return (RTN) instructions, a branch instruction part of interrupt level register 4a is referred to.

A comparator (COMP) 6a compares the selected interrupt-enable level (IEL) with the interrupt level of the interrupt request IQL from the encoder 18 (not shown, see FIG. 2A). Depending upon the comparison result, the comparator 6a outputs an EBL signal indicating that the interrupt request IQL is to be enabled for interrupt. On receipt of the EBL signal, an initiator (INIT) 5a gates out 4 bits, for example, of the interrupt level of the external interrupt request IQL to the execution unit 3a to initiate the interrupt function of the execution unit 3a.

For example, it is assumed that there are a total of six interrupt levels 0–5 of the external interrupt requests, with level 0 having the highest priority and level 5 having the lowest priority. It is further assumed that the interrupt request is to be accepted when the interrupt level of the external interrupt request signal is smaller than the interrupt-enable level in the interrupt level register 4a, wherein the interrupt-enable level corresponds to the OP code of the fetched instruction.

In this example, if an interrupt request signal having interrupt level 5 is input as the IQL signal via the memory controller 30 and the circuits 15–18 when the instruction decoder 2a has fetched an instruction having interrupt-enable level 5 according to the interrupt level register 4a, that external interrupt request is not accepted, but held in accordance with the above condition. When an instruction having interrupt-enable level 6 or more appears, the interrupt request being held is enabled for interrupt and accepted.

Figure 2C:
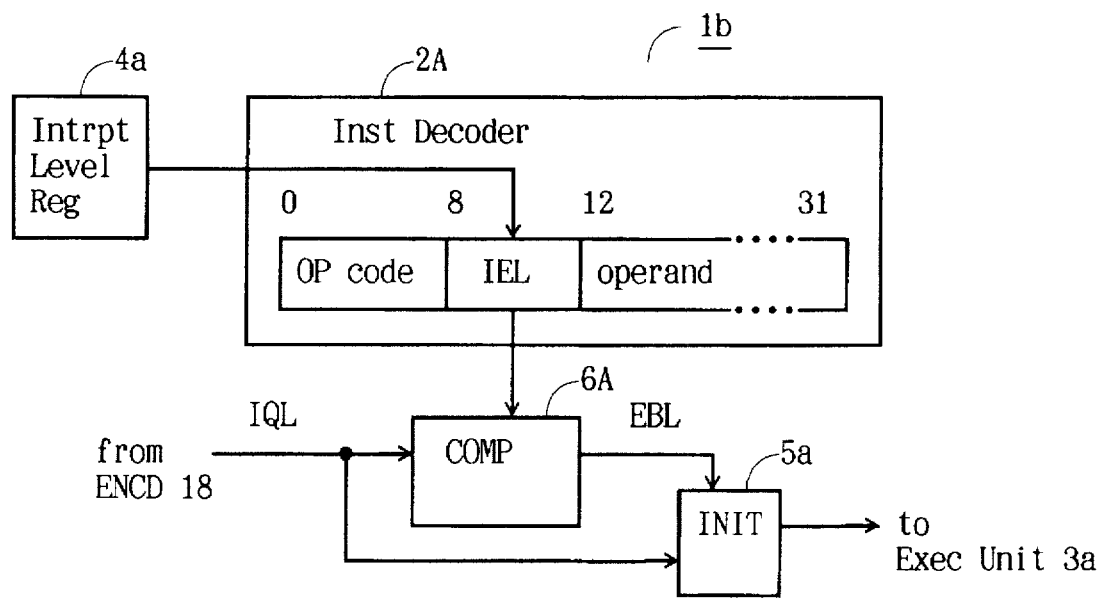
FIG. 2C is a schematic diagram illustrating a modification of the first embodiment of the present invention.

FIG. 2C is a schematic diagram illustrating a modification of the first embodiment of the present invention.

Using this modification, when decoding an instruction, an instruction decoder 2A reads from the interrupt level register 4a, the interrupt-enable level (IEL) data corresponding to the OP code and adds the level data to the OP code. A comparator 6A then compares the interrupt-enable level (IEL) in the instruction decoder 2A with that of the interrupt request IQL from the encoder circuit 18 (see FIG. 2C) to determine whether to enable or disable the interrupt request IQL in dependence upon the comparison result. This produces the same effect as in the above example.

Figure 3:
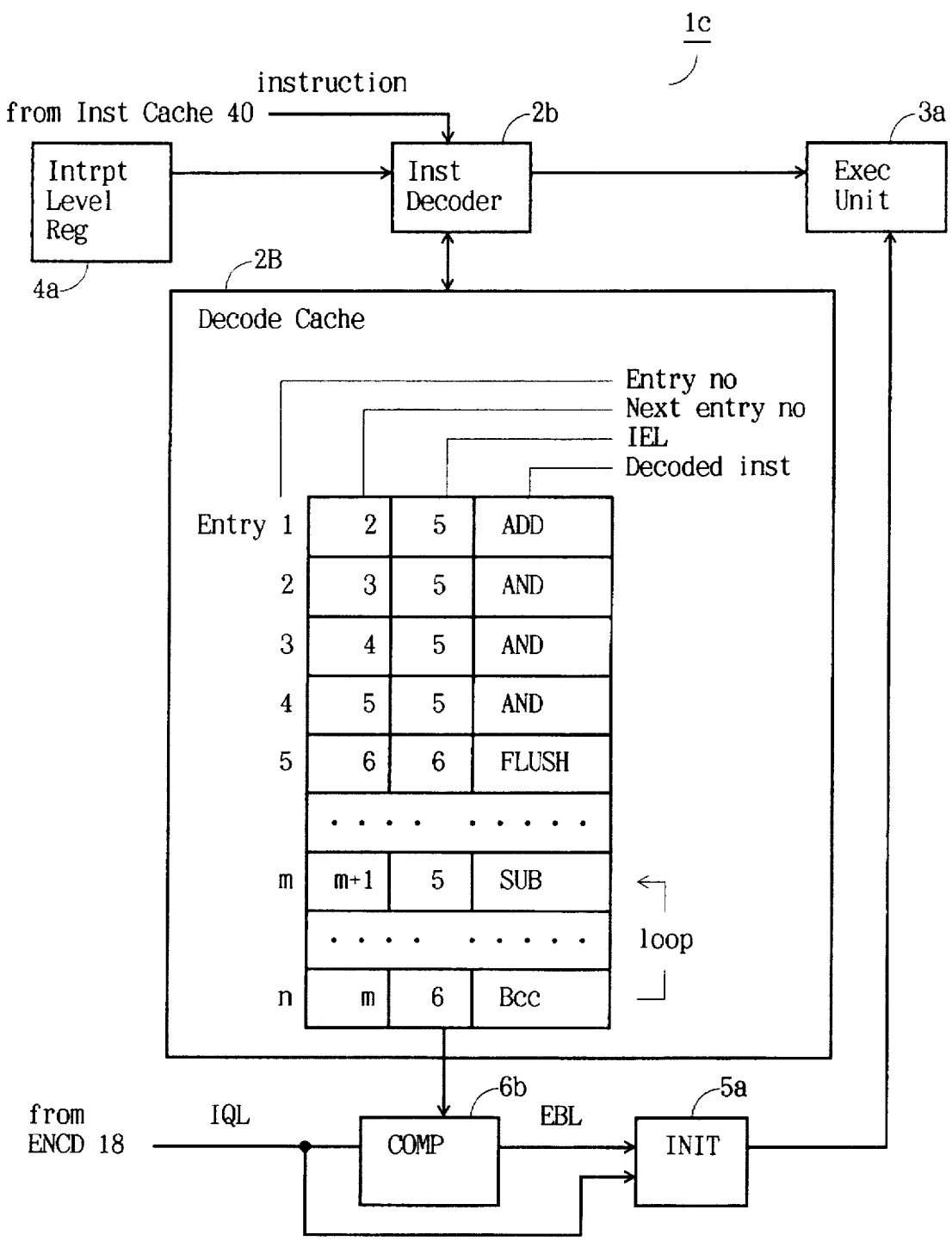
FIG. 3 is a schematic diagram illustrating an interrupt control circuit according to a second embodiment of the present invention.

FIG. 3 is a schematic diagram illustrating an interrupt control circuit according to the second embodiment of the present invention, in which the CPU 1c is provided with a decode cache 2B.

The instruction decoder 2b fetches a plurality of instructions from the instruction cache 40, decodes them to facilitate execution of the instructions by the execution unit 3a, and stores the decoded instruction in the decode cache 2B. When the instructions form a loop in the decode cache 2B as shown in FIG. 3, the looped instructions need not be fetched from the instruction cache 40, repeatedly every time a branch instruction is encountered and therefore, the looped instructions can be executed at a high speed. Thus, a decode cache is effective and is often used in a data processing unit.

The decode cache 2B comprises a plurality of (n) entries, each entry including at least a decoded instruction (for easy understanding, only the OP code is shown) and a next entry number specifying the entry whose instruction is to be executed next. In the example shown in FIG. 2C, when decoding the instructions fetched from the instruction cache 40, the instruction decoder 2b reads the interrupt-enable level data (IEL), corresponding to the OP code of the instructions, from the interrupt level register 4a, and stores the level data in each entry.

If there is an interrupt request input or held when the instruction decoder 2b fetches a decoded instruction from the decode cache 2B to have the execution unit 3a execute it, a comparator (COMP) 6b compares the interrupt level of the external interrupt request IQL from the encoder 18 (not shown, see FIG. 2A) with the interrupt-enable level (IEL) of the instruction fetched.

For example, when the former is smaller than the latter, the comparator 6b outputs an EBL signal indicating that the interrupt request IQL is to be enabled for interrupt. On receipt of the EBL signal, an initiator (INIT) 5a gates out, for example, 4 bits signifying the interrupt level of the external interrupt request IQL to the execution unit 3a to initiate the interrupt function of the execution unit 3a.

In the following example, too, it is assumed that there are a total of six interrupt levels 0–5 of external interrupt requests, with level 0 having the highest priority and level 5 having the lowest priority, and that the interrupt request IQL is enabled on condition that the interrupt level of the external interrupt request signal IQL is smaller than the interrupt-enable level stored in the decode cache 2B along with the instruction.

It is also assumed that an interrupt request signal IRQ input to the CPU 1c has interrupt level 5 and that it is selected and encoded into the IQL signal via the circuits 15–18, as shown in FIG. 2A. At this point, CPU 1c does not immediately accept the interrupt request, but checks the decode cache 2B for an interruptible instruction, i.e., control instruction and holds the interrupt request until the interruptible instruction is executed.

In this example, the external interrupt request is held because the interrupt level 5 of the interrupt request in not smaller than the interrupt-enable level 5 of the first four general instructions. Then, when the fifth instruction (FLUSH) is encountered, the interrupt request which has been held is accepted, because the interrupt level 5 of the interrupt request is smaller than the interrupt-enable level 6 of the FLUSH instruction. The FLUSH instruction, which is defined for hardware to manipulate the cache memory, writes the contents of the instruction cache 40 (or data cache 50) into the main memory 20 so as to keep the contents of both memories matched.

Figure 4:
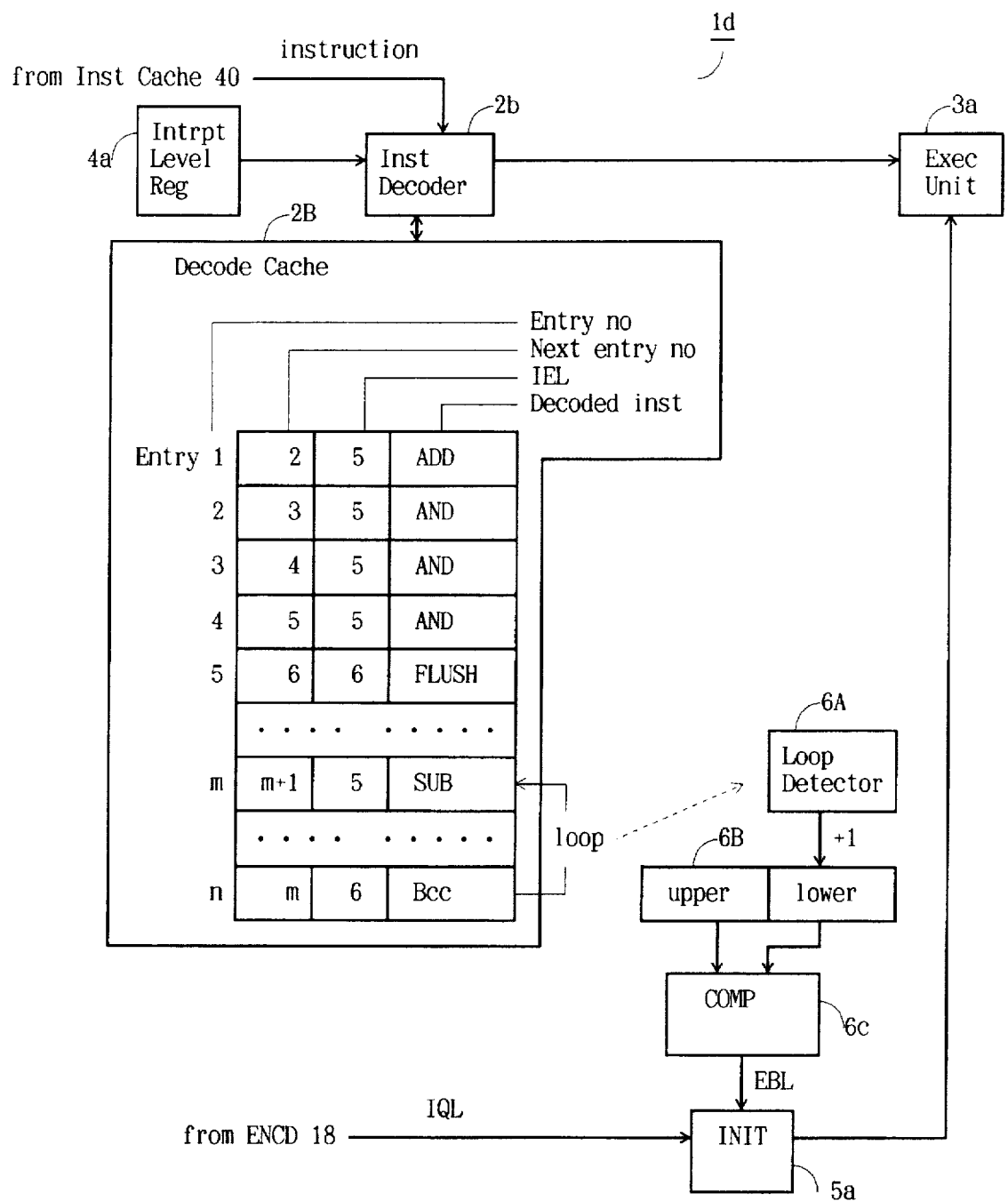
FIG. 4 is a schematic diagram illustrating an interrupt control circuit according to a third embodiment of the present invention.

FIG. 4 is a schematic diagram illustrating an interrupt control circuit according to the third embodiment of the present invention, in which the CPU 1d is provided with a loop counter 6B in addition to the elements shown as part of CPU 1c in FIG. 3. The upper part of the loop counter 6B stores an upper bound, previously set by a program, loop repetitions and the lower part counts the loops executed.

When the CPU 1d has fetched an entry (e.g., entry n in the example) from the decode cache 2B for execution, a loop detector 6A checks to see if the next entry number (e.g., entry m in the example) thereof, which indicates the entry to be executed next, is smaller than the present entry number (n). If so, the loop detector 6A determines that the program forms a loop and, when there is an interrupt request input or held, adds one to the lower part of the loop counter 6B. A comparator (COMP) 6c compares the contents of upper and lower parts of the loop counter 6B and, when both become equal, outputs an EBL signal indicating that the interrupt request IQL is to be enabled for interrupt. The comparator 6c then clears the lower part to zero.

On receipt of the EBL signal, an initiator (INIT) 5a gates out, for example, 4 bits of the interrupt level of the external interrupt request IQL to the execution unit 3a to initiate the interrupt function of the execution unit 3a. This can prevent such inconveniences as a time-out error from occurring when an interrupt request is not accepted but held for a long time because of a program loop including no interruptible instruction.

Figure 5A:
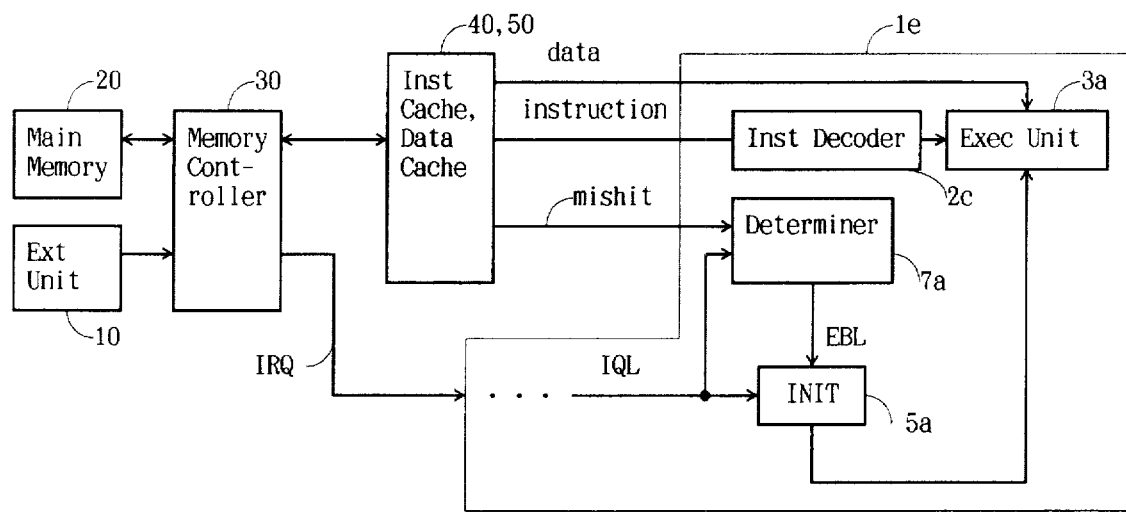
FIG. 5A is a block diagram illustrating an interrupt control circuit according to a fourth embodiment of the present invention.
Figure 5B:
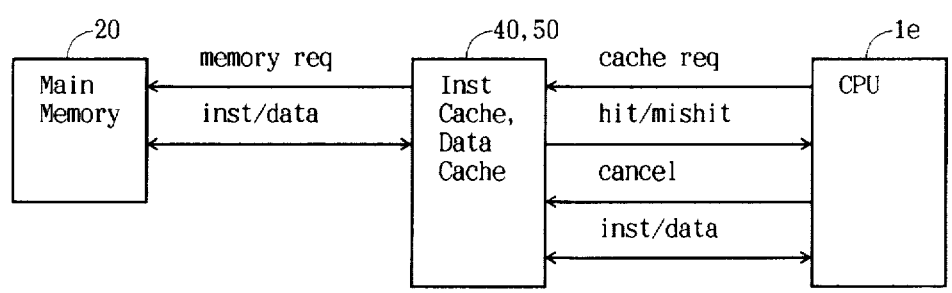
FIG. 5B is a schematic diagram illustrating a cache mishit.

FIG. 5A is a block diagram illustrating an interrupt control circuit according to the fourth embodiment of the present invention. FIG. 5B is a schematic diagram illustrating a cache mishit.

A CPU 1e sends a "cache request" signal to the instruction cache 40 (or data cache 50) to request an instruction (or data). If the instruction cache 40 does not include the instruction requested, it sends a "mishit" signal to the CPU 1e and reads the instruction (or data) from the main memory 20, instead. However, the time required for reading the instruction (or data) from the main memory 20 is extremely long compared with a machine cycle of the CPU 1e. The present invention saves that time by performing an interrupt operation instead of fetching the instruction (or data) from the main memory 20.

If there is an external interrupt request input and enabled as the IQL signal when the mishit signal is received, a determiner 7a causes the CPU 1e to send a "cancel" signal to the instruction cache 40 so as to cancel the cache request signal and outputs an EBL signal indicating that the interrupt request IQL is to be enabled for interrupt. On receipt of the EBL signal, an initiator (INIT) 5a gates out the 4-bit interrupt level signal of the external interrupt request IQL to the execution unit 3a to initiate the interrupt function of the execution unit 3a. Unless there is an external interrupt request input when the mishit signal is received, the CPU 1e does not send the cancel signal but keeps sending the cache request signal to read the instruction from the main memory 20.

Figure 6A:
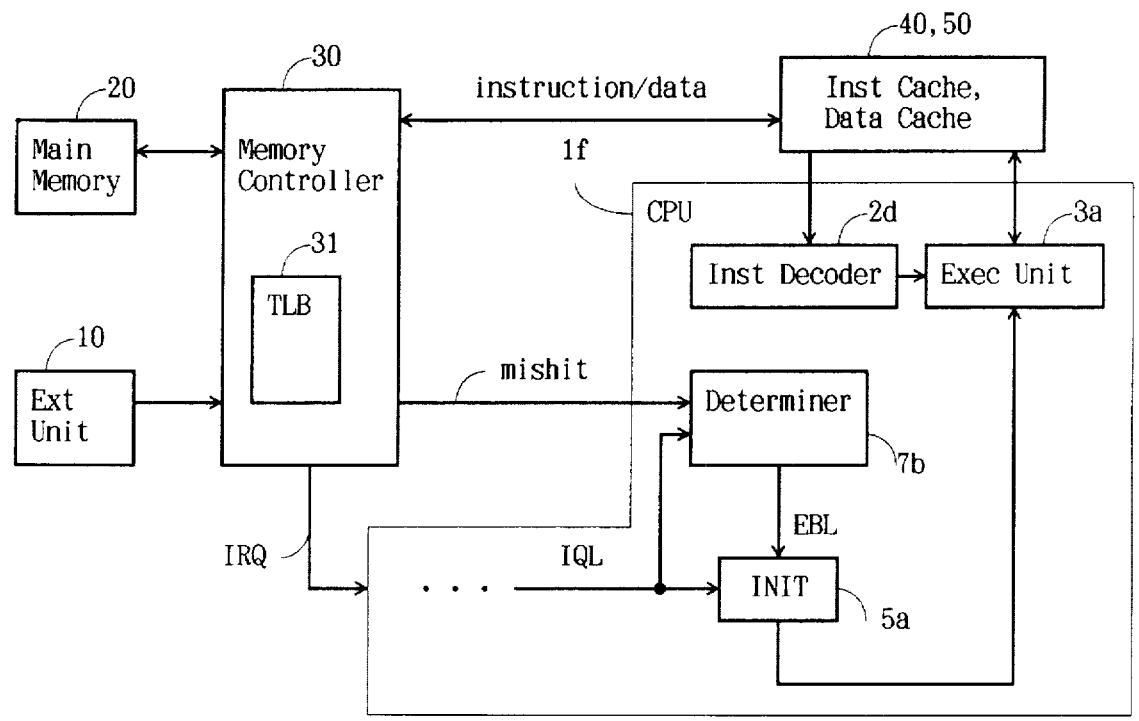
FIG. 6A is a block diagram illustrating an interrupt control circuit according to a fifth embodiment of the present invention.
Figure 6B:
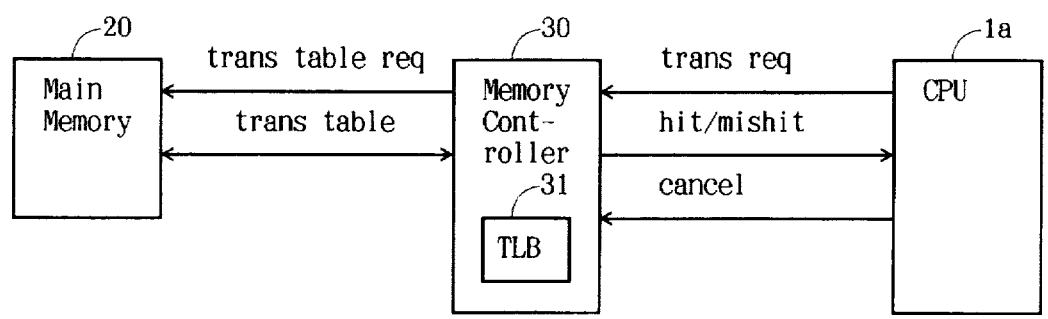
FIG. 6B is a schematic diagram illustrating a TLB mishit.

FIG. 6A is a block diagram illustrating an interrupt control circuit according to the fifth embodiment of the present invention. FIG. 6B is a schematic diagram illustrating a TLB mishit.

This embodiment is associated with an interrupt control circuit for an CPU 1f with a dynamic address translation feature which, in a virtual memory system, changes a virtual memory address to a real memory address during execution of an instruction.

To address-translates an instruction or data, CPU 1f sends a "translation request" signal (abbreviated to "trans request" in the Figure) to the memory controller 30. If a translation table for translating the instruction or data is not in a special buffer called Translation Lookaside Buffer (abbreviated to TLB) 31, the memory controller 30 sends a "mishit" signal to CPU 1f and reads the translation table from the main memory 20. It then performs an address translation using the translation table read from the main memory 20 and stores the translation table in the TLB 31. The time required for reading the translation table from the main memory 20 is extremely long compared with a machine cycle of the CPU 1f. The present invention saves that time by performing an interrupt operation instead of reading the translation table from the main memory 20 as follows:

In the same way as the above example, if there is an external interrupt request input and enabled as the IQL signal when the mishit signal is received, a determiner 7b causes the CPU If to send a "cancel" signal to the the memory controller 30 so as to cancel the translation request signal and outputs an EBL signal indicating that the interrupt request IQL is to be enabled for interrupt. On receipt of the EBL signal, an initiator (INIT) 5a gates out the 4-bit interrupt level of the external interrupt request IQL to the execution unit 3a to initiate the interrupt function of the execution unit 3a. Unless there is an external interrupt request input when the mishit signal is received, the CPU 1f is not caused to send the cancel signal but keeps sending the translation request signal to read the translation table from the main memory 20.

Figure 7A:
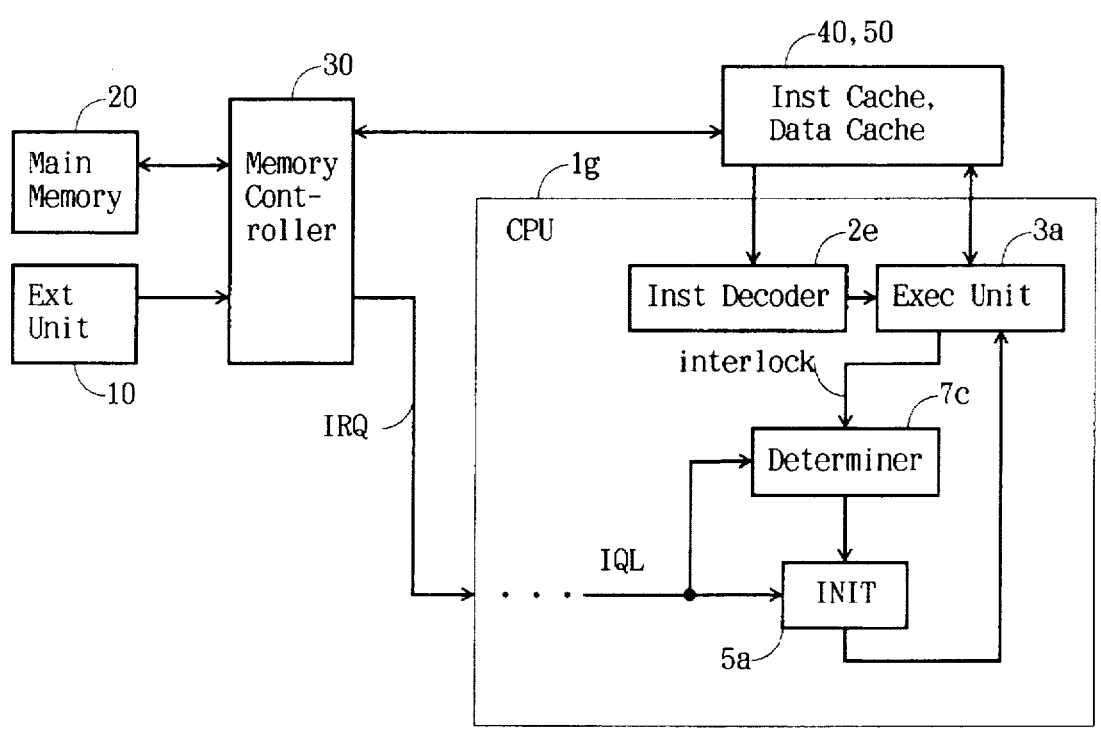
FIG. 7A is a block diagram illustrating an interrupt control circuit according to a sixth embodiment of the present invention.
Figure 7B:
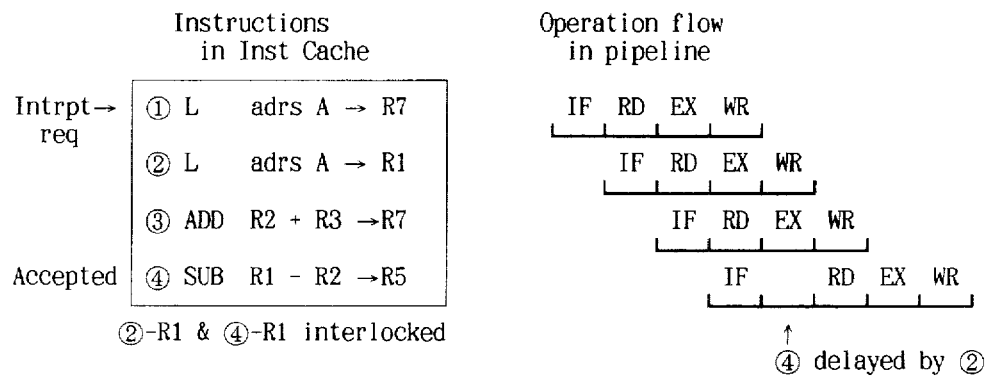
FIGS. 7B and 7C are schematic diagrams illustrating a pipeline interlock.
Figure 7C:
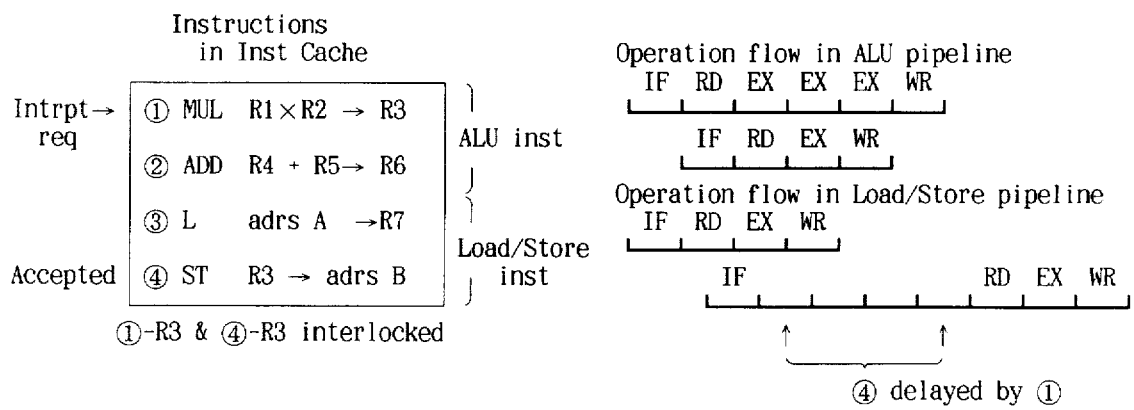

FIG. 7A is a block diagram illustrating an interrupt control circuit of the sixth embodiment of the present invention. FIGS. 7B and 7C are schematic diagrams illustrating a pipeline interlock.

In recent years, data processing units utilizing a pipeline or even a plurality of pipelines for execution of instructions in order to reinforce processing performance is wide-spread.

When different instructions within a pipeline or between a plurality of pipelines share the same single hardware resource, they may interfere with each other, causing an interlock. The interlock prevents an instruction from being executed in step with a system clock, causing a delay in execution of the instruction. The present invention accepts an external interrupt request, if any, when an interlock is developed and performs an interrupt operation, thus making use of the time in which the instruction, i.e., program execution is delayed.

In FIG. 7A, when detecting an interlock developed in a pipeline or between pipelines, an execution unit 3a outputs an interlock signal to a determiner 7c. The determiner 7c checks to see if there is an external interrupt request is input and enabled as the IQL signal and, if there is, sends an EBL signal indicating that the interrupt request IQL is to be enabled for interrupt. Upon receipt of the EBL signal, an initiator (INIT) 5a gates out the 4-bit interrupt level signal of the external interrupt request IQL to the execution unit 3a to initiate the interrupt function of the execution unit 3a.

FIG. 7B shows an example of an interlock developed in a single pipeline. The righthand figure shows a fashion in which instructions 1–4 listed left flow in a pipeline and an interlock develops therein.

Instruction 1 loads contents of address A into register R7. Instruction 2 loads contents of address A into register R1. Instruction 3 adds contents of register R2 to those of R3 and stores the addition result in register R7. Instruction 4 subtracts contents of register R3 from those of register R1 and stores the subtraction result in register R7.

IF, RD, EX, and WR at pipeline stages represent instruction fetching, operand reading, instruction execution (e.g., addition, subtraction, and multiplication), and operand storing, respectively. In the Figure, instruction 2 and instruction 4 fall in an interlock in an attempt to access register R1, which causes instruction 4 to wait at the pipeline stage RD until instruction 2 is completed. Accordingly, an external interrupt request, which is generated at the timing the instruction 1 is fetched, is held until the interlock is detected during execution of instruction 4 and is accepted immediately thereafter.

FIG. 7C shows an example of an interlock developed between a plurality of pipelines.

The righthand figure shows a fashion in which instructions 1–4 listed left flow in two pipelines (ALU pipeline for instructions which use the ALU; Load/Store pipeline for load/store instructions) and an interlock develops therebetween.

In the Figure, instruction 1 and instruction 4 fall in an interlock in an attempt to access register RS, which causes instruction 4 to wait at the pipeline stage RD until instruction 1 is completed. Accordingly, an external interrupt request, which is generated at the timing the instruction 1 is fetched, is held until the interlock is detected during execution of instruction 4, and accepted immediately thereafter.

As described above, the present invention specifies interrupt-enable levels specifying, corresponding to the kind of instructions, what level of an external interrupt request to accept for interrupt. If there is an interrupt request input when an instruction is fetched, the interrupt-enable level corresponding to the instruction is compared with the level of the interrupt request and the interrupt request is accepted or held in dependence upon the comparison result. Also, the present invention accepts an interrupt request when desired item of data is not found in a cache memory or translation lookaside buffer or when an interlock develops in s pipeline.

Accordingly, the present invention can solve a problem of the conventional interrupt control circuit which unconditionally accepts an external interrupt request enabled by a mask bit, even if it may not be so urgent, eventually invalidating the instructions and data in a cache memory or a pipeline. Therefore, the present invention can make the best use of the high-speed processing features and facilities and therefore, can have the data processing unit demonstrate an expected processing performance.

What is claimed is:

1. An interrupt control circuit for a data processing unit which fetches and executes instructions for controlling an interrupt request signal from an external device which has an assigned interrupt level, said interrupt control circuit comprising:

level storage means for storing interrupt-accept level data corresponding to each instruction and specifying the interrupt level of the interrupt request signal to be accepted for interrupt;

first comparison means for reading, when an instruction is fetched for execution, the interrupt-accept level data corresponding to the instruction from said level storage means and for comparing the interrupt-accept level with the interrupt level of the interrupt request signal; and first acceptance means for accepting the interrupt request signal to initiate the interrupt function upon the comparing by said first comparison means.

2. An interrupt control circuit according to claim 1, wherein said level storage means stores the interrupt-accept level data which corresponds to a classification of the instruction.

3. An interrupt control circuit according to claim 1, wherein the interrupt-accept level data is set in said level storage means by a program.

4. An interrupt control circuit according to claim 1, further comprising:

setting means for setting a number;

loop detection means for detecting a loop of the instructions during execution of the instructions;

count means for counting the loops detected by said loop detection means;

second comparison means for comparing the number set by said setting means with the number of loops counted by said count means; and second acceptance means for accepting the interrupt request signal to initiate the interrupt function of the data processing unit upon the comparing by said second comparison means.

5. An interrupt control circuit for a data processing unit which has first buffer storage means for storing a plurality of instructions, the interrupt control circuit for controlling an interrupt request signal which is input from an external device which has an assigned interrupt level, said interrupt control circuit comprising:

level storage means for storing interrupt-accept level data corresponding to an instruction and specifying the interrupt level of the interrupt request signal to be accepted for interrupt;

transfer means for reading the interrupt-accept level data, from said level storage means, corresponding to the instruction stored in the first buffer storage means and for storing the interrupt-accept level data into an area of the first buffer storage means corresponding to the instruction;

first comparison means for reading the interrupt-enable level data, from the first buffer storage means, corresponding to an instruction fetched from the first buffer storage means for execution and for comparing the interrupt-enable level with the interrupt level of the interrupt request signal; and first acceptance means for accepting the interrupt request signal to initiate the interrupt function of the data processing unit upon the comparing by said first comparison means.

6. An interrupt control circuit according to claim 5, wherein said first buffer storage means stores a single instruction.

7. An interrupt control circuit according to claim 5, wherein said level storage means stores the interrupt-accept level data which corresponds to a classification of the instruction.

8. An interrupt control circuit according to claim 5, wherein the interrupt-accept level data is set in said level storage means by a program.

9. An interrupt control circuit according to claim 5, further comprising:

setting means for setting a number;

loop detection means for detecting a loop of the instructions during execution of the instructions;

count means for counting the loops detected by said loop detection means;

second comparison means for comparing the number set by said setting means with the number of loops counted by said count means; and second acceptance means for accepting the interrupt request signal to initiate the interrupt function of the data processing unit upon the comparing by said second comparison means.

10. An interrupt control circuit according to claim 9, wherein said first buffer storage means comprises a storage device which includes a plurality of entries, each entry having an entry number and storing an instruction and a next entry number which specifies the number of an entry whose instruction is to be executed next, and said loop detection means detects a loop when an entry includes the next entry number which is smaller than the entry number thereof.

11. A method of controlling an interrupt request signal which is input from an external device having an assigned interrupt level during execution of instructions, said method comprising the steps of:

(a) storing interrupt-accept level data corresponding to each instruction which specifies the interrupt level of the interrupt request signal to be accepted for interrupt;

(b) reading the interrupt-accept level data corresponding to each instruction when an instruction is fetched for execution;

(c) comparing the interrupt-accept level read in step (b) with the interrupt level of the interrupt request signal; and (d) accepting the interrupt request signal to initiate the interrupt function of the data processing unit in dependence upon the comparison in step (c).

12. A method according to claim 11, further comprising:

(g) setting a number;

(h) detecting a loop of the instructions during execution of the instructions;

(i) counting the loops detected in step (h);

(j) comparing the number set in step (g) with the number of loops counted in step (i); and (k) accepting the interrupt request signal to initiate the interrupt function of the data processing unit in dependence upon the comparison in step (j).

13. A method for using a data processing unit which has first buffer storage means for storing a plurality of instructions, to control an interrupt request signal input from an external device having an assigned interrupt level, said method comprising the steps of:

(a) storing interrupt-accept level data corresponding to the instruction specifying an interrupt level of the interrupt request signal to be accepted for interrupt;

(b) reading the interrupt-accept level data corresponding to the instruction;

(c) storing the interrupt-accept level data read in step (b) into an area which corresponds to the instruction;

(d) reading the interrupt-enable level data corresponding to a fetched instruction;

(e) comparing the interrupt-enable level read with the interrupt level of the interrupt request signal; and (f) accepting the interrupt request signal to initiate the interrupt function of the data processing unit in dependence upon the comparing in step (e).

14. A method according to claim 13, further comprising:

(g) setting a number;

(h) detecting a loop of the instructions during execution of the instructions;

(i) counting the loops detected in step (h);

(j) comparing the number set in step (g) with the number of loops counted in step (i); and (k) accepting the interrupt request signal to initiate the interrupt function of the data processing unit in dependence upon the comparison in step (j).

* * * * *

UNITED STATES PATENT AND TRADEMARK OFFICE
CERTIFICATE OF CORRECTION

PATENT NO. : 5,615,375
DATED : Mar. 25, 1997
INVENTOR(S) : IBUSUKI et al.

It is certified that error appears in the above-indentified patent and that said Letters Patent is hereby corrected as shown below:

Col. 1, line 14, after "buffers" insert --,--.

Col. 2, line 15, change "interrupt accept" to --interrupt-accept--.

Col. 5, line 59, after "program," insert --for--.

Col. 6, line 49, change "If" to --1f--;
line 59, change "If" to --1f--.

Col. 7, line 4, change "If" to --1f--.

Col. 8, line 21, change "s" to --a--.

Signed and Sealed this

Twenty-second Day of July, 1997

Attest:

BRUCE LEHMAN

Attesting Officer

Commissioner of Patents and Trademarks